US006971702B2

(12) United States Patent
Boettger et al.

(10) Patent No.: US 6,971,702 B2
(45) Date of Patent: Dec. 6, 2005

(54) MOLDING FOR PREVENTING SPALLING OF AUTOMOTIVE WINDSHIELDS

(75) Inventors: Tom Boettger, Dearborn, MI (US); Mukta Mehandru, Nothville, MI (US); Kris Cockerel, Shepherdsville, KY (US); Maria Hertaler, Northville, MI (US); Carolyn Tatge, Northville, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 10/754,110

(22) Filed: Jan. 8, 2004

(65) Prior Publication Data

US 2005/0052048 A1    Mar. 10, 2005

Related U.S. Application Data

(60) Provisional application No. 60/500,976, filed on Sep. 8, 2003.

(51) Int. Cl.⁷ .............................................. B60J 10/02
(52) U.S. Cl. .................................. 296/93; 296/146.15
(58) Field of Search ............................ 196/93, 146.15; 52/208

(56) References Cited

U.S. PATENT DOCUMENTS

| 4,953,907 A | 9/1990 | Sugita ........................ 296/93 |
| 4,960,631 A | 10/1990 | Walters ...................... 428/192 |
| 5,032,444 A | 7/1991 | Desir ......................... 428/122 |
| 5,338,087 A | 8/1994 | Gross ..................... 296/146.15 |
| 5,529,650 A | 6/1996 | Bowers ........................ 156/64 |
| 5,544,458 A | 8/1996 | Fisher .................... 52/204.591 |
| 5,752,352 A | 5/1998 | Goto .......................... 52/208 |
| 6,089,646 A | 7/2000 | Xu ....................... 296/146.15 |
| 6,227,598 B1 | 5/2001 | Ichioka ....................... 296/93 |
| 6,257,644 B1 | 7/2001 | Young ......................... 296/93 |
| 6,279,983 B1 | 8/2001 | Biondo ........................ 296/93 |
| 6,328,368 B1 | 12/2001 | Liu ............................ 296/93 |
| 6,382,696 B1 | 5/2002 | Young ......................... 296/93 |
| 6,460,300 B2 * | 10/2002 | Mikkaichi et al. ...... 52/204.597 |

OTHER PUBLICATIONS

Distrupol website, ALCRYN MPR, www.distrupol.com, 2 pages, Jun. 2003.*

* cited by examiner

Primary Examiner—Dennis H. Pedder
(74) Attorney, Agent, or Firm—Gigette M. Bejin; Miller Law Group PLLC

(57) ABSTRACT

A windshield trim molding is affixed to the peripheral edge of an automotive windshield during the manufacturing process of mounting the windshield on an automobile chassis. The windshield molding incorporates an extruded strip of elastomeric material, such as ALCRYN or RAUPREN melt-processible rubber, at the contact surface of the molding where a windshield primer is applied to the glass prior to the installation of the molding. As a result, the elastomeric material becomes bonded to the windshield glass, rather than the plastic molding. The strip of extruded elastomeric material is softer than either the windshield glass or the plastic molding and absorbs any failure due to differences in thermal expression rates between the plastic molding and the windshield glass, thus preventing spalling at the peripheral edge of the windshield.

11 Claims, 1 Drawing Sheet

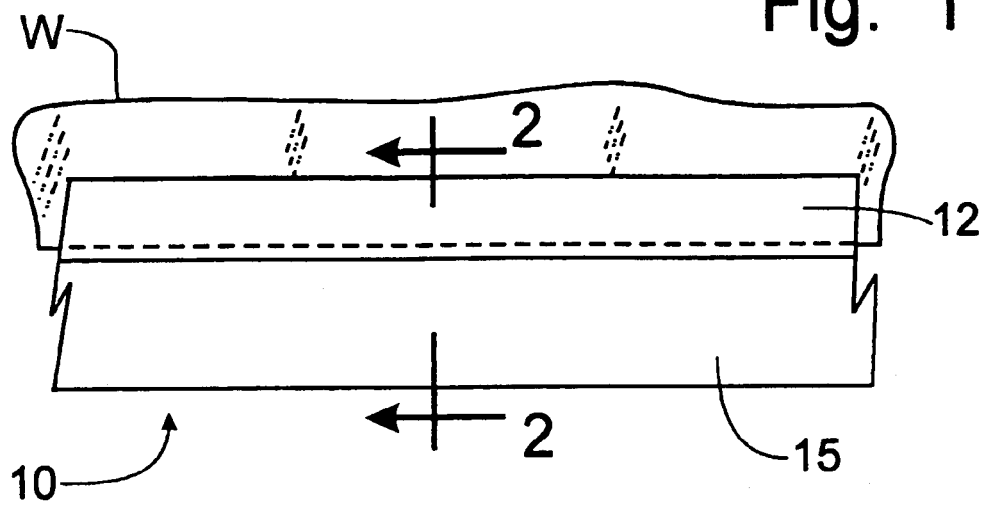
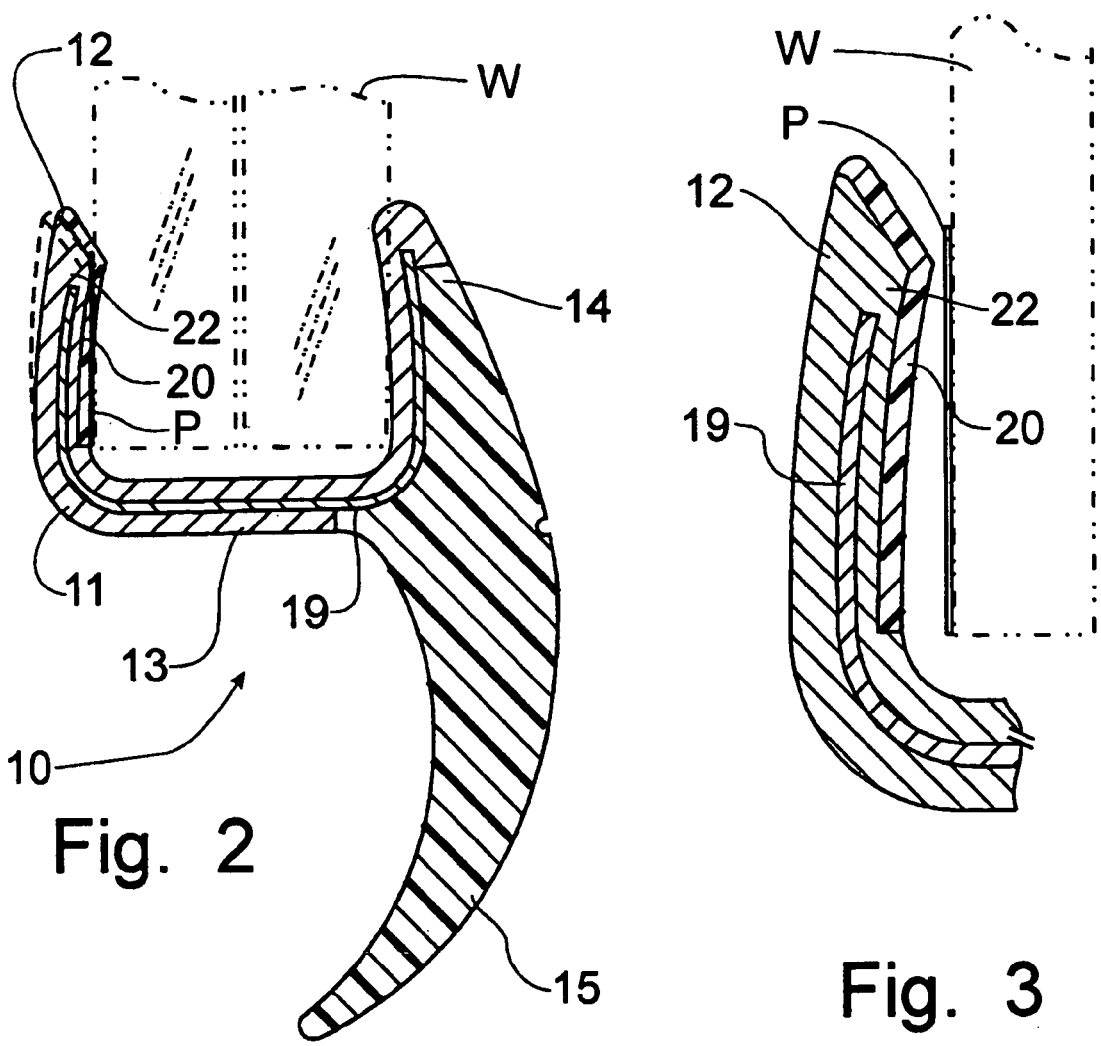

MOLDING FOR PREVENTING SPALLING OF AUTOMOTIVE WINDSHIELDS

CROSS REFERENCE TO RELATED APPLICATIONS

This application claims priority on U.S. Provisional Patent Application Ser. No. 60/500,976, filed Sep. 8, 2003, the contents of which are incorporated herein by reference.

BACKGROUND OF THE INVENTION

A windshield is typically mounted in a molding positioned at the circumferential edges of the windshield and fixed to the chassis of the automobile by an adhesive. When the vehicle is moved, whether being operated or undergoing shipment from the manufacturer to the dealer, the windshield is subjected to external forces that can cause a failure in the glass at the circumferential edge of the windshield, particularly at the engagement of the edge of the molding with the surface of the windshield near the peripheral edge thereof.

Windshields are typically installed through a process that applies a primer to the molding and a second primer to the windshield glass along the windshield molding member to promote bonding of the urethane adhesive to the glass material. This application of the primers has resulted in an undesirable bonding of the molding member to the windshield glass. Given temperature fluctuations experienced by automobiles in either their operation or the shipping thereof, the molding member expands and contracts at a different rate than the windshield glass, resulting in a fracture in the more fragile glass material. Secondary fractures then propagate from the primary thermal expansion fracture to create a visible glass chip at the edge of the windshield.

Process solutions to this problem could result in an improvement in glass failures; however, process changes require corresponding changes in the manufacturing operations that can require substantial expense to implement. However, improvements for the molding to prevent the failures due to thermal expansion of the bonded molding and glass interface, would not require changes in the manufacturing process on in the manufacturing line.

As is taught in U.S. Pat. No. 6,382,696, issued to Jack D. Young on May 7, 2002, the window trim molding can be formed of different elastomers to provide some support for the peripheral edge of the windshield glass, but does not have the rigidity or the low cost provided by a plastic windshield trim molding. In U.S. Pat. No. 6,328,368, issued to Ken Tu Liu, et al on Dec. 11, 2001, and in U.S. Pat. No. 6,279,983, issued to James R. Blondo, et al on Aug. 28, 2001, the windshield trim molding, as well as a method of installing automotive window trim molding, are taught, but as with the Young patent the molding is formed by elastomeric material.

In U.S. Pat. No. 6,257,644, issued to Jack D. Young on Jul. 10, 2001; U.S. Pat. No. 4,953,907, issued to Tooru Sugita on Sep. 4, 1990; U.S. Pat. No. 4,960,631, issued to Patricia B. Walters, et al on Oct. 2, 1990; and U.S. Pat. No. 5,032,444, issued to Julio Desir, Sr., on Jul. 16, 1991, window molding formed from one or more combinations or layers of elastomeric material are taught, but none teach the formation of a plastic molding having a strip of extruded elastomeric material affixed to a contact surface of the molding.

In U.S. Pat. No. 5,338,087, issued to Michael G. Gross, et al on Aug. 16, 1994, the window molding is formed from a plastic (polyvinyl chloride) that is co-extruded with an elastomeric material that forms the entire contact surface engaging the peripheral edge of the window glass. Co-extrusion of elastomeric materials is also taught in U.S. Pat. No. 5,529,650, issued to Daniel W. Bowers, et al on Jun. 25, 1996. U.S. Pat. No. 5,752,352, issued to Shinichi Goto, et al on May 19, 1998, teaches a co-extrusion of a polyvinyl chloride plastic molding with a softer elastomeric material bonded to the exterior side away from the window glass. Similarly, U.S. Pat. No. 6,227,598, issued to Tetsumi Ichioka, et al on May 8, 2001, teaches a multiple part window sealant that includes a polyvinyl chloride portion and an co-joined elastomer portion; however, the inside contact portion of the molding does not include a strip of extruded elastomeric material.

U.S. Pat. No. 5,544,458, issued to Daniel J. Fisher, et al on Aug. 13, 1996; and U.S. Pat. No. 6,089,646, issued to Qihua Xu, et al on Jul. 18, 2000, teach a gasket bonded by a primer layer to one side of the window glass.

Accordingly, it would be advantageous to provide an improvement to windshield molding to permit the installation of the molding to the peripheral edge of the windshield without causing fractures in the glass from thermal expansion even though the molding is bonded to the glass.

SUMMARY OF THE INVENTION

It is an object of this invention to overcome the aforementioned disadvantages of the known prior art by providing a windshield molding that incorporates an insert to bond to the glass without causing failures to the edge of the glass due to differences in thermal expansion.

It is another object of this invention to improve windshield molding to incorporate an insert that can bond to the windshield glass without causing failure to the glass due to differences in thermal expansion.

It is a feature of this invention that the windshield molding includes an insert that will absorb the failure caused by differences in thermal expansion when the molding is bonded to the windshield glass.

It is an advantage of this invention that the improvement to the windshield molding does not require any substantial manufacturing process changes for the installation of windshields on automotive vehicles.

It is yet another advantage of this invention that the utilization of an extruded insert member does not require the use of a new material for forming the molding.

It is another advantage of this invention that only a structural change in the windshield trim molding is required to eliminate windshield spalling fractures due to thermal expansion differences when the windshield molding is bonded to the windshield glass.

It is another feature of this invention that the insert is placed at the edge of the molding where the molding contacts the windshield glass.

It is still another feature of this invention that the use of the insert member will not interfere with the retention of the molding when using a urethane adhesive.

It is still another feature of this invention that the molding insert can be manufactured from an elastomeric material such as ALCRYN melt-processible rubber.

It is still another advantage of this invention that the insert material is softer than both the molding material and the windshield glass.

It is yet another feature of this invention that the softer insert material can bond to the windshield glass through the use of glass primers without subjecting the glass to fractures from differences in thermal expansion.

It is yet another advantage that the quality improvement in the process of installing windshield glass is obtained at a minimal cost.

It is a further advantage of this invention that the use of the insert member does not risk contamination of the windshield bond joint.

It is a further object of this invention to provide a windshield trim molding for use in mounting a windshield on an automobile chassis to eliminate thermal expansion induced fractures that is durable in construction, inexpensive of manufacture, carefree of maintenance, facile in assemblage, and simple and effective in use.

These and other objects, features and advantages are accomplished according to the instant invention by providing a windshield trim molding that is affixed to the peripheral edge of an automotive windshield during the manufacturing process of mounting the windshield on an automobile chassis. The windshield molding incorporates an extruded strip of elastomeric material, such as ALCRYN or RAUPREN melt-processible rubber, at the contact surface of the molding where a windshield primer is applied to the glass prior to the installation of the molding. As a result, the elastomeric material becomes bonded to the windshield glass, rather than the plastic molding. The strip of extruded elastomeric material is softer than either the windshield glass or the plastic molding and absorbs any failure due to differences in thermal expansion rates between the plastic molding and the windshield glass, thus preventing spalling at the peripheral edge of the windshield.

BRIEF DESCRIPTION OF THE DRAWINGS

The advantages of this invention will become apparent upon consideration of the following detailed disclosure of the invention, especially when taken in conjunction with the accompanying drawings wherein:

FIG. 1 is an elevational view of a portion of a windshield trim molding mounted to the peripheral edge of the windshield glass for an automobile incorporating the principles of the instant invention, portions of the windshield molding and the windshield glass being broken away for purposes of clarity;

FIG. 2 is an enlarged cross-sectional view of the windshield molding taken along lines 2—2 of FIG. 1, a representative section of windshield glass being shown in phantom; and FIG. 3 is an enlarged detail view of the contact tip of the windshield molding incorporating an extruded strip of elastomeric material to be placed in contact with the windshield glass according to the principles of the instant invention, the windshield glass being shown in phantom adjacent the contact tip with the primer affixed to the surface thereof.

DETAILED DESCRIPTION OF THE PREFERRED EMBODIMENT

Referring to FIGS. 1–3, a portion of a windshield molding mounted on the peripheral edge of a windshield and incorporating the principles of the instant invention can best be seen. The molding 10 is formed in a general U-shaped configuration that encapsulates the peripheral edge of a windshield glass member W. The molding 10 includes a body 11 that is formed with a pair of opposing legs 12, 14 that engage opposite sides of the windshield glass W. Preferably, the legs 12, 14 project outwardly from a bight portion 13 and are angled inwardly slightly toward one another so as to provide a little spring-like force on the windshield glass W when spread apart to be mounted on the edge of the glass W. The molding 10 is also preferably formed with an integral elastomeric member 15 that projects rearwardly in opposition to the legs 12, 14 to seal against the automobile chassis (not shown) in a known manner.

In the known manufacturing process for mounting the molding 10 onto the windshield glass W, the molding is coated with a primer prior to the installation of the windshield glass W. Once the molding 10 is installed on the glass W, a second primer is then applied to the glass W using the molding 10 as a guide. If the second primer seeps under the edge of the molding 10, the glass W can bond to the molding 10. Subsequent thermal changes can then result in a fracturing of the edge of the glass W through shear forces because of the differences in the coefficient of thermal expansion between the conventional polyvinyl chloride (PVC) molding 10 and the glass windshield W. Waiting a period of time for the windshield primer to cure before continuing the manufacturing process results in an increased manufacturing time for installing the windshield W onto the automotive chassis and requires a substantial revision to the manufacturing process.

Preferably the body 11 of the molding 10 is formed from PVC bonded to a stiffening member 19, i.e. an aluminum carrier, which provides a spring force for the legs 12, 14 when spread apart to encapsulate the edge of the windshield glass W. The elastomeric member 15 and the body 11 are co-extruded in a known manner and joined into an integral configuration.

The lower leg 12 is also formed with a strip of elastomeric material 20, such as ALCRYN or RAUPREN melt-processible rubber, which can also be co-extruded with the body 11 to form an integral configuration. The elastomeric strip 20 provides a softer material than either the PVC leg 12 or the glass W to which the strip 20 will be bonded by the applied primer P and will absorb any failure associated with the thermal expansion differential between the PVC and glass materials. The use of the elastomeric strip 20 on only one leg 12 provides adequate protection for the thermal expansion differential without detracting from the retention of the windshield W within the molding 10. Furthermore, the use of the elastomeric strip does not require a significant change in the manufacturing process for installing the windshield W onto an automotive chassis.

The elastomeric strip 20 extends from the remote tip of the leg 12 to the joinder thereof with the bight portion 13 so as to present an engagement surface for substantially the entire leg 12 with the glass W. The elastomeric strip 20 replaces only a portion of the PVC material such that a portion 22 of PVC material remains structurally between the elastomeric strip 20 and the stiffening member 19. Accordingly, the molding 10 with the co-extruded strip 20 of elastomeric material along the inside of the lower leg 12 provides substantially the same physical attributes as the conventional PVC molding without the strip 20 while providing protection against spalling from thermal expansion differentials.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts,

Having thus described the invention, what is claimed is:

1. A windshield molding for mounting on an automotive windshield comprising:

a substantially rigid plastic body portion including a bight portion and first and second opposing legs projecting from said bight portion, said legs being engagable with opposing surfaces of said windshield along a peripheral edge thereof, said legs being operable to flex in opposition to one another to accept a positioning of said windshield therebetween;

an elastomeric member integrally formed with said body portion and projecting from said bight portion in an opposing direction from said first leg, said second leg being positioned opposite said elastomeric member and said first leg with said bight portion spacing said first and second legs; and an elastomeric strip of material formed on an inside surface of an upper portion of said second leg for engagement with the corresponding surface of said windshield such that said upper portion of said second leg will be bonded to said windshield only through said elastomeric strip, an inside surface of said plastic first leg for engaging the corresponding surface of said windshield.

2. The windshield molding of claim 1 wherein said elastomeric strip is co-extruded with said body portion and forms an integral part of said one leg.

3. The windshield molding of claim 1 wherein elastomeric strip is formed of a melt-processible rubber.

4. The windshield molding of claim 3 wherein said rigid plastic body portion is formed of polyvinyl chloride.

5. The windshield molding of claim 4 wherein said body portion is formed with a stiffening member formed internally therein.

6. A windshield assembly for an automotive vehicle comprising:

a windshield glass defining a peripheral edge;

a primer material applied to a portion of said windshield glass adjacent said peripheral edge; and a molding mounted on said peripheral edge of said windshield glass on top of said primer material, said molding including:

a substantially rigid plastic body portion including a bight portion and first and second opposing legs projecting from said bight portion, said legs being engagable with opposing surfaces of said windshield glass along said peripheral edge, said legs being operable to flex in opposition to one another to accept said windshield therebetween; and an elastomeric strip of material formed on an inside surface of said second leg for engagement with the corresponding surface of said portion of said windshield glass such that said primer material will bond to said second leg through said elastomeric strip, an inside surface of said plastic first leg contacting the corresponding surface of said windshield opposite of said second leg having said elastomeric strip of material.

7. The windshield assembly of claim 6 wherein said body portion is formed with a stiffening member formed internally therein.

8. The windshield assembly of claim 6 wherein said elastomeric strip is co-extruded with said body portion and forms an integral part of said one leg.

9. The windshield assembly of claim 8 wherein elastomeric strip is formed of a melt-processible rubber.

10. The windshield assembly of claim 7 wherein said body portion is formed of polyvinyl chloride, said stiffening member being an aluminum carrier.

11. The windshield assembly of claim 8 wherein said molding further includes an elastomeric member integrally formed with said body portion and projecting from said bight portion in an opposing direction from said legs.

* * * * *